US009848060B2

(12) United States Patent
Fitzpatrick et al.

(10) Patent No.: US 9,848,060 B2
(45) Date of Patent: *Dec. 19, 2017

(54) COMBINING DISPARATE APPLICATIONS INTO A SINGLE WORKLOAD GROUP

(71) Applicant: International Business Machines Corporation, Armonk, NY (US)

(72) Inventors: Michael Gerard Fitzpatrick, Raleigh, NC (US); Andrew Hilliard Arrowood, Raleigh, NC (US); Grant Stephen Mericle, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 294 days.

This patent is subject to a terminal disclaimer.

(21) Appl. No.: 14/829,667

(22) Filed: Aug. 19, 2015

(65) Prior Publication Data

US 2016/0165006 A1 Jun. 9, 2016

Related U.S. Application Data

(63) Continuation of application No. 14/565,268, filed on Dec. 9, 2014, now Pat. No. 9,516,137.

(51) Int. Cl.
*G06F 15/16* (2006.01)
*H04L 29/08* (2006.01)
*H04L 29/06* (2006.01)

(52) U.S. Cl.
CPC .......... *H04L 67/32* (2013.01); *H04L 67/1004* (2013.01); *H04L 67/1008* (2013.01); *H04L 69/16* (2013.01); *H04L 67/1029* (2013.01); *H04L 69/18* (2013.01)

(58) Field of Classification Search
CPC . H04L 67/32; H04L 67/1004; H04L 67/1008; H04L 67/1029; H04L 69/16; H04L 69/18
USPC ................ 709/201, 215, 219, 226, 235, 238
See application file for complete search history.

(56) References Cited

U.S. PATENT DOCUMENTS

| 5,021,949 | A | 6/1991 | Morten et al. |
| 7,089,311 | B2 | 8/2006 | Devine et al. |
| 7,533,173 | B2 * | 5/2009 | Badovinatz ........... G06F 9/5061 709/224 |

(Continued)

OTHER PUBLICATIONS

IBM Multi-site Workload Lifeline V2.0 User's Guide, Version 2, Release 0, Chapter 1, Jun. 2014.

*Primary Examiner* — Michael Y Won
(74) *Attorney, Agent, or Firm* — David Zwick; David H. Judson; Jeffrey S. LaBaw

(57) ABSTRACT

Different protocol applications (e.g., TCP/IP server applications and SNA applications) are monitored and combined into a same workload, and load balancing decisions are made that affect both types of applications. In the approach, monitoring agents verify the health and availability of both the TCP/IP server applications and SNA applications, and such information is then used by a workload manager to create a distribution policy for the workload. The workload manager provides the distribution policy to a load balancing mechanism, which is operable to distribute workload connections to any of these applications. The TCP/IP connections and SNA sessions for a workload group are then routed to one site, or to an alternate site.

7 Claims, 5 Drawing Sheets

(56) References Cited

U.S. PATENT DOCUMENTS

| | | | |
|---|---|---|---|
| 2009/0327908 A1* | 12/2009 | Hayton | G06F 21/6218 |
| | | | 715/744 |
| 2011/0138037 A1* | 6/2011 | Sharma | G06F 9/505 |
| | | | 709/224 |
| 2012/0297067 A1 | 11/2012 | Arrowood et al. | |
| 2012/0297068 A1 | 11/2012 | Arrowood et al. | |
| 2013/0198755 A1* | 8/2013 | Kim | G06F 9/505 |
| | | | 718/104 |
| 2014/0032768 A1* | 1/2014 | Ding | G06F 9/505 |
| | | | 709/226 |
| 2016/0011902 A1* | 1/2016 | Agarwal | G06F 9/46 |
| | | | 718/102 |

* cited by examiner

COMBINING DISPARATE APPLICATIONS INTO A SINGLE WORKLOAD GROUP

BACKGROUND OF THE INVENTION

Technical Field

This disclosure relates generally to data processing systems and, in particular to managing requests received from clients. Still more particularly, the disclosure relates to load balancing and managing requests from clients.

Background of the Related Art

Workload load balancing is a technique to distribute TCP/IP-based workload requests (connections) across similar server applications to achieve optimal resource utilization, maximize throughput, minimize response time, and to avoid overloading server applications or systems. By using multiple server applications (instead of a single server application) with load balancing, one can increase reliability through redundancy. The load balancing service usually is provided by a dedicated software program or hardware device. A workload manager provides distribution recommendations to the load balancing service (i.e. a load balancer appliance).

In workload management environments of this type, server applications that access the same data sources typically are included in the same workload. This allows monitoring agents to verify that all of these applications are available and able to handle additional connections on behalf of the workload. It also enables a workload manager to have a consolidated view of the applications in the workload, thereby enabling easy switching of the workloads between geographically separated sites (i.e., different clusters of systems). In particular, the workload manager can signal a load balancer appliance that all connections to the server applications making up the workload are to be switched at the same time to the alternate site. This ensures that access by the applications to the data sources is only done from one site at any point in time.

Many customers with mainframe applications and a need to access their data sources either have moved their business applications to TCP/IP server applications, or they have written new TCP/IP server applications. A significant percentage of these customer workloads, however, are still accessed as SNA applications. This creates a dilemma for customers that have both TCP/IP server applications and legacy SNA applications accessing the same data sources, as there are no existing methods to monitor and switch workload connections for both types of applications.

BRIEF SUMMARY

Generally, this disclosure describes a method that provides for the grouping of different types of applications (e.g., TCP/IP server applications and SNA applications) under a same workload. This grouping enables workload managers to direct a load balancer appliance to route workload connections to both application types to one site, or to an alternate site.

In particular, and according to an embodiment of this disclosure, when both TCP/IP server applications and SNA applications access the same data sources (that are mirrored across sites), they are associated together within a same workload group so that these different types of applications can be monitored to determine the overall availability for the workload. According to this disclosure, monitoring agents verify the health and availability of both the TCP/IP server applications and SNA applications, and such information is then used by a workload manager to create a distribution policy for the workload. The workload manager provides the distribution policy to a load balancing mechanism (e.g., a load balancer appliance) that is capable of distributing workload connections to any of these applications. The TCP/IP connections and SNA sessions for a workload group are then routed to one site, or the alternate site.

Thus, according to this disclosure, different protocol applications are monitored and combined into a same workload, and load balancing decisions are made that affect both types of applications. The load balancer routes workload connections that are destined to the different protocol applications the same way because these applications have been grouped into the same workload.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

Figure 1:
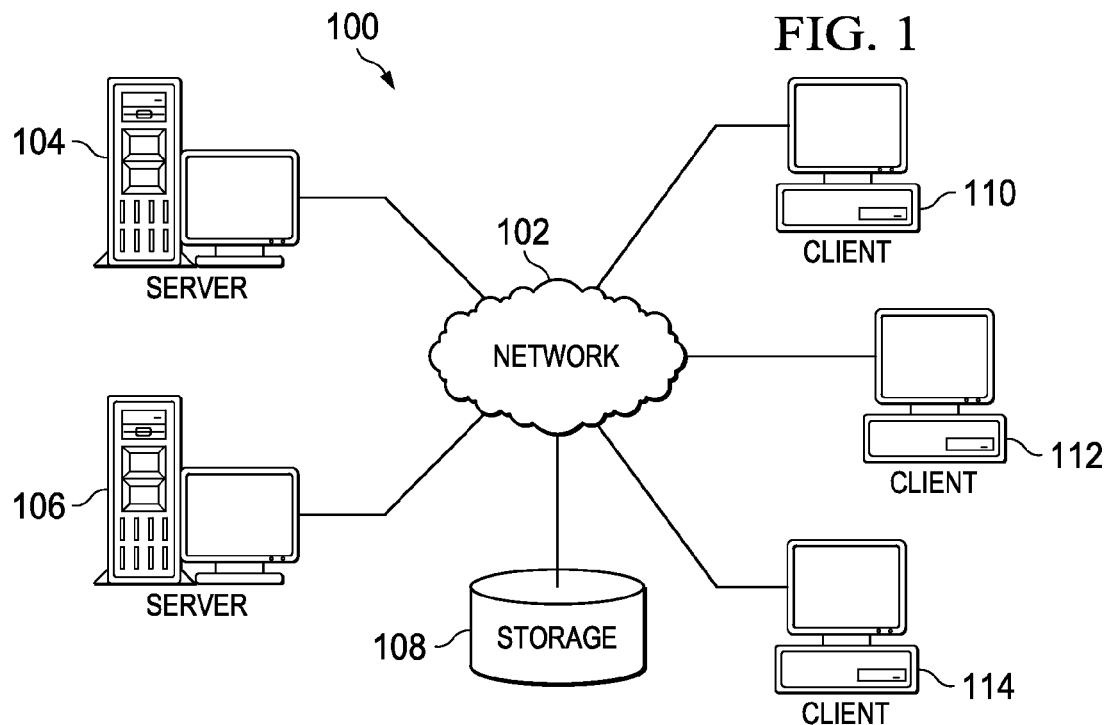
FIG. 1 depicts an exemplary block diagram of a distributed data processing environment in which exemplary aspects of the illustrative embodiments may be implemented.
Figure 2:
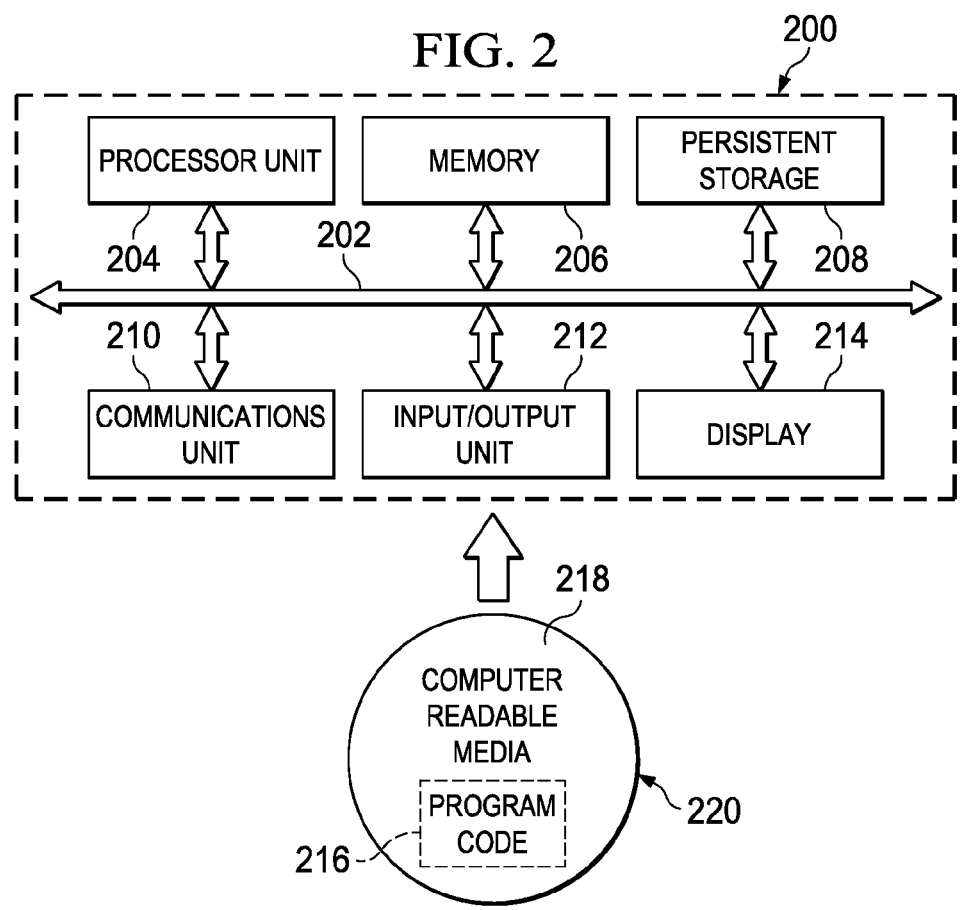
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

Client-Server Technologies

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Legacy Computer Systems

Mainframe computer systems are widely used for a variety of data processing functions. For example, many corporate financial and accounting systems were developed for, and operate on, mainframe computing systems. Although the use of personal computers and personal computer networks has proliferated in recent years, mainframe computer systems, referred to as legacy systems, are expected to remain popular for many types of data processing for years to come. A mainframe computer system typically includes multiple user terminals connected to a mainframe host computer. Various software applications may be resident on, or accessible to, the host computer. The user terminals, which are sometimes referred to as client terminals or "clients," communicate with the mainframe host computer via a host communications system. The IBM 3270 terminal system is one of the more widely-used systems for communicating with host computers. Typically, a 3270 terminal does not have its own data processing capability. Instead, a 3270 terminal may display screens generated by applications running on a host, and may communicate information from a user back to a host for processing. A user interface of an IBM 3270 terminal system comprises a plurality of screens that are generated by host applications for display on the 3270 terminal. Over the past few years, many 3270 terminals have been replaced with personal computers (PCs) configured to communicate with the mainframe computer system via 3270 terminal emulation software.

In many applications, 3270 terminals, or other data processing devices (e.g., a PC) emulating a 3270 terminal, now access the host computer via the Internet. For example, in systems operating under the TN3270E protocols, the 3270 terminals may access application software on a host computer via a combination of a TCP/IP connection between the TN3270E client terminal and a TN3270E server, and via a Systems Network Architecture (SNA) session between the TN3270E server and the SNA application software on the host mainframe computer. As is well-known, SNA is an IBM® proprietary networking architecture. It provides for a complete protocol stack to interconnect computers and their associated resources. A typical SNA implementation using various communications packages, such as Virtual Telecommunications Access Method (VTAM), which is a mainframe software package for SNA communications. SNA application software or "SNA applications" refer to software applications designed for use by a plurality of terminals interconnected by an SNA network or a variant of an SNA network. An SNA session refers to a session layer connection in the SNA network architecture or its equivalent in variations or modified versions of the layered SNA network architecture.

The term "TN3270E server" typically encompasses both servers operating in the TN3270E environment and servers operating in modified versions or variations of the TN3270E environment. Furthermore, the term "TN3270E server" refers to any system which interfaces between the IP connection and the SNA session. Thus, the TN3270E server may appear as a server to the TN3270E client and as a terminal to the SNA application.

It is also known to integrate client-server technologies with mainframe computing environments. A representative multi-component system of this type, wherein components work together cooperatively to form a larger system, is the IBM® HyperText Transfer Protocol (HTTP) and Web Services processing environment, which may be implemented using IBM mainframe computers, such as the IBM z196 family of computing machines. This environment typically includes IBM's WebSphere® Application Server (WAS) middleware platform software product, working in conjunction with one or more transaction processing products, such as IBM Customer Information Control System (CICS®) and/or IBM Information Management System (IMS), a message processing product, such as IBM WebSphere MQ, and a relational database, such as the IBM DB2® database. An objective of a multi-component environment is to provide a high performance transaction processing computing system or environment accessible to client end-users via Internet browsers using HTTP or other Web Services. In this environment, the client end-user making the HTTP or Web Services request communicates directly with the application server. Typically, to fulfill the transaction request from the distributed client end-user, the application server invokes the services of one or more other components in the environment. One of more of these components typically execute on an operating system, such as IBM z/OS® operating system, which is often referred to as a "mainframe" operating system platform.

Load Balancing Workload Groups

Figure 3:
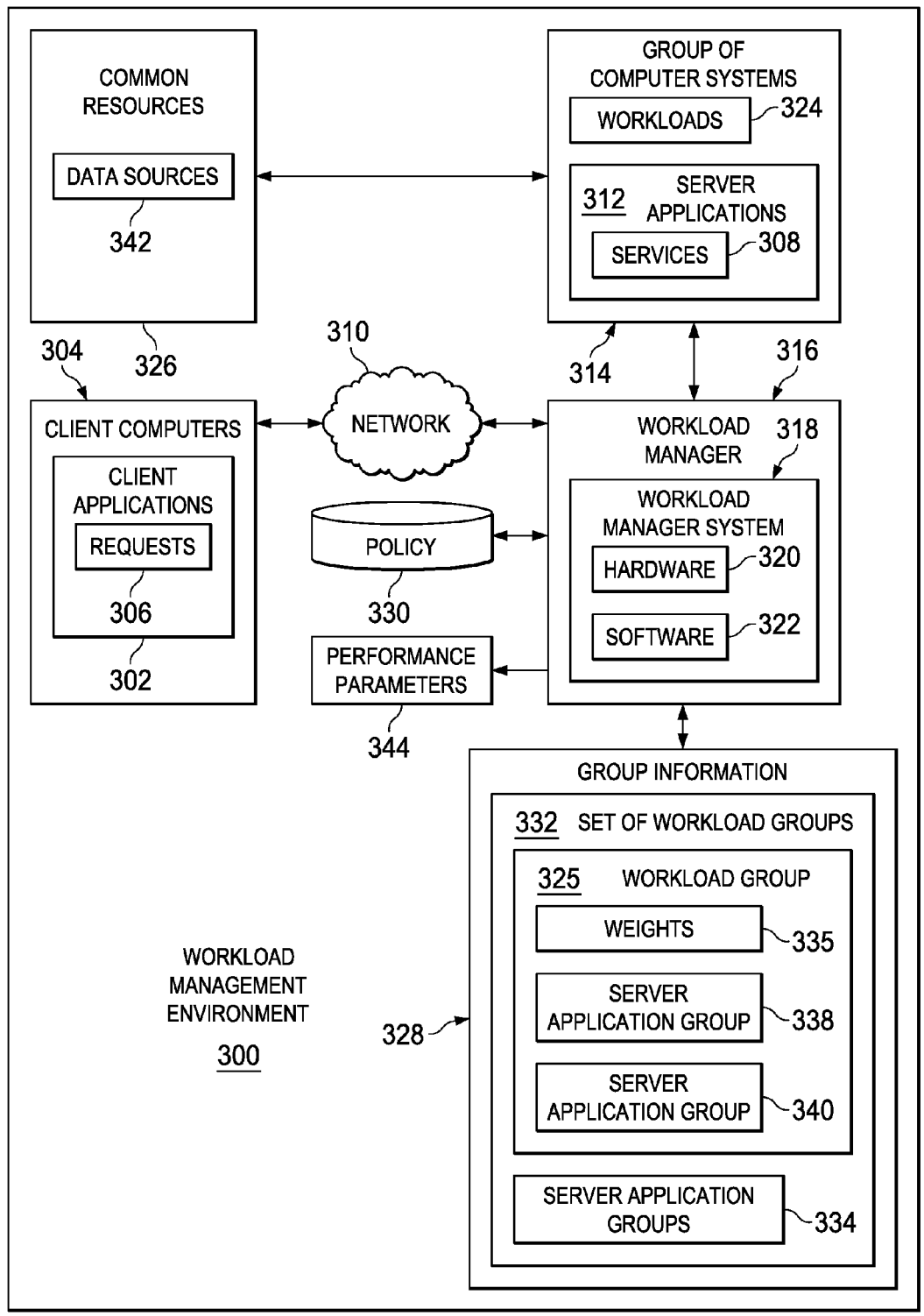
FIG. 3 illustrates a workload management environment.

As further background, FIG. 3 illustrates a representative workload management environment 300 in which the techniques of this disclosure may be implemented.

In this environment, client applications 302 run on client computers 304 within or in association with the workload management environment 300. As depicted, client applications 302 generate requests 306 for services 308. Services 308 may include, for example, at least one of retrieving a file, retrieving a webpage, writing data, downloading a program, deleting a file, and/or other suitable types of access. Requests 306 are sent over network 310 to server applications 312 on group of computer systems 314. Server applications 312 may be any applications configured to process requests 306 to provide services 308. Server applications 312 may be, for example, at least one of a database server, a file transfer protocol (FTP) server, a web server, a mail server, and/or other suitable types of applications. In these illustrative examples, computer systems within group of computer systems 314 may be a computer, a computer cluster, or other configurations of computer systems configured to run server applications 312.

Workload manager 316 sends requests 306 to server applications 312. Workload manager 316 may be implemented using hardware, software, or a combination of the two. When implemented with hardware, workload manager 316 takes the form of workload manager system 318. Workload manager system 318 comprises hardware 320 and also may include software 322. When processor units are used in hardware 320, these processor units may be located on the same or different computers.

Workload manager 316 is configured to balance workloads 324 in group of computer systems 314. Workloads 324 are balanced by the manner in which workload manager 316 distributes requests 306 to server applications 312 running on group of computer systems 314. Workload manager 316 may be implemented in a number of different ways. For example, workload manager 316 may include load balancing processes and may directly distribute requests 306 to server applications 312. Alternatively, workload manager 316 may make recommendations for the distribution of requests 306. These recommendations may then be used by a load balancer implemented as a separate component to distribute requests 306 to server applications 312.

Server applications 312 may access common resources 326 when processing requests 306. Common resources 326 may include data sources, storage systems, processor systems, routing systems, and/or other suitable types of resources. Resources may take the form of hardware, data, software, or other suitable forms. A common resource within common resources 326 is a resource that is used by two or more server applications within server applications 312.

Workload manager 316 identifies which of server applications 312 receive particular requests from requests 306 based on common resources 326 used by server applications 312. Workload manager 316 may be implemented in various devices. For example, workload manager 316 may be implemented in a switch, a domain name server, and/or other suitable types of hardware devices. In these illustrative examples, workload manager 316 selects a server application within server applications 312 to process a request in requests 306 based on group information 328 and policy 330. Group information 328, in these examples, is groupings of server applications 312. For example, group information 328 comprises set of workload groups 332. Set of workload groups 332 is comprised of server application groups 334. Each workload group in set of workload groups 332 has two or more server application groups from server application groups 334. In addition, weights 335 may be associated with server application groups 334. In other words, each server application in a server application group may have one or more weights. Additionally, each server application group also may be assigned one or more weights. Weights 335 are used with policy 330.

Policy 330 is one or more rules for determining which of server applications 312 receive particular requests in requests 306. Policy 330 may include rules for assigning requests 306 based on common resources 326. Weights 335 may be applied to policy 330 in assigning requests 306 based on common resources 326. For example, a rule in policy 330 may be to assign all requests to server applications 312 that use a particular common resource. For example, the common resource may be a computer system in group of computer systems 314. As another example, when accessing data sources, two data sources may be copies of each other in which different server applications in server applications 312 are assigned to each of the copies of the data source. These data sources may be synchronized or updated at some point so that the copies are identical. With this type of resource, policy 330 may include a rule that states that access to a particular cell, record, entry, table, or other portion of a data source are all made to the same copy.

Typically, workload manager 316 performs load balancing for a workload group. Each server application group has one or more server applications. Typically, load balancing is performed with respect to a server application group. In the illustrative examples, workload manager 316 is further configured to provide load balancing based on workload groups. For example, workload group 325 in set of workload groups 332 includes server application group 338 and server application group 340. Some of the server applications in server application group 338 may run on the same computer system as some of the server applications in server application group 340. This is one example of a use of common resources 326. As another example, some of the server applications in server application group 338 may access the same data sources as some of the server applications in server application group 340. This access to data resources is another example of common resources 326.

By load balancing using server applications from server application group 338 and server application group 340 that use common resources 326, improved performance may occur. For example, if common resources 326 include data sources 342 that are synchronized between different server applications in server application group 338 and server application group 340, distributing the requests to server applications that use the same data source may reduce conflicts between data sources 342 when these data sources are replicated.

In these illustrative examples, server applications in server application group 338 and server application group 340 that use the same data source in data sources 342 are considered to be on the same computer system. As a result, server applications in the same cluster that end up in different server groups may be taken into account in load balancing when those server groups are put together into a workload group. Workload manager 316 may use the mapping of server application groups into a workload group to provide better load balancing with respect to distributing requests to server applications 312 that use common resources 326 as compared to load balancing just within a server application group.

Workload manager 316 also may identify performance parameters 344 generated during processing of requests 306. Performance parameters 344 are any values that relate to the use of resources to process requests 306. These resources may include common resources 326. Results from analyzing performance parameters 344 may be used to identify inefficiencies in accessing common resources 326. The result may be used to modify group information 328. Inefficiencies may include, for example, without limitation, conflicts in data, a larger than desired number of locks for data, data access requiring more time than desired, under use of a hardware resource, and other inefficiencies.

The modification of group information 328 may include adding a workload group, changing server application groups within a workload group, deleting a workload group, and/or other suitable modifications. Further, changing values for weights 335 in policy 330 also may occur using the results from the analysis of performance parameters 344.

The illustration of workload management environment 300 in FIG. 3 is not meant to imply physical or architectural limitations to the manner in which different illustrative embodiments may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment. For example, in some illustrative examples, additional workload managers, in addition to workload manager 316, may be present within network 310. For example, although workload manager 316 is shown as a block separate from group of computer systems 314, workload manager 316 may be implemented in one or more computer systems in group of computer systems 314.

Figure 4:
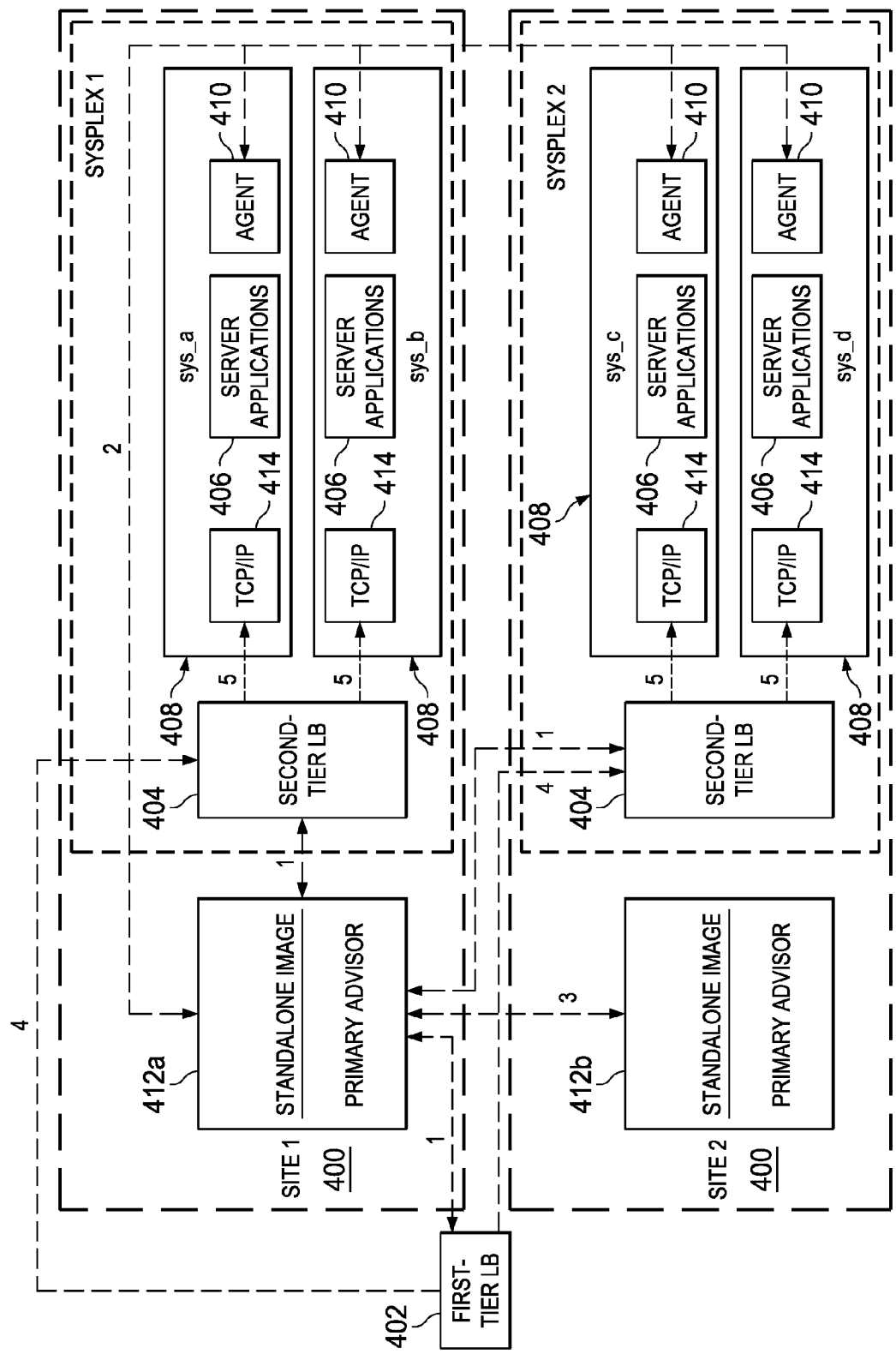
FIG. 4 illustrates how a known multi-site workload management system is used to load balance TCP/IP workload.

FIG. 4 illustrates a representative implementation of a workload management environment, such as described above with respect to FIG. 3. In this example, IBM® Multi-site Workload Lifeline V2.0 is used to implement the management environment to load balance TCP/IP workload requests across two sites at unlimited distances, when both sites are running the same server applications and have the same data sources. Although two sites are shown, there may be additional sites. In this example, and as will be seen, the system preferably defines two (2) tiers of load balancing. Generally, a first-tier load balancer registers application groups that contain members that are in both sites. These members are considered second-tier load balancers. An external load balancer, operating as a second-tier load balancer, registers groups of server applications that are on the same site. As this external load balancer receives a workload connection request from a first-tier load balancer, the external load balancer distributes the request to one of the server applications in the matching application group.

Each workload that is configured to Multi-site Workload Lifeline is classified as an active/standby or active/query workload. By definition, an active/standby workload can be distributed to only one site at a time, because the workload might contain transactions that update databases. By contrast, an active/query workload can be distributed to both sites at the same time, because the workload contains only transactions that query databases. Multi-site Workload Lifeline enforces the single or dual site distribution. If more than one workload is configured, some of the workloads can be distributed to one site, some workloads can be distributed to the other site, and the remaining workloads can be distributed to both sites.

As seen in FIG. 4, and in a concrete (but non-limiting) example, each site 400 is configured as a systems complex or "sysplex." A sysplex is a collection of Multiple Virtual Storage (MVS) systems that cooperate, using certain hardware and software products, to process work. The sysplex increases the number of processing units and MVS operating systems that can cooperate, which in turn increases the amount of work that can be processed at the site. It uses a standard communication mechanism (the cross-system coupling facility, or XCF) for MVS system applications that enables communication between application programs on one or multiple computers. From an architecture standpoint, typically the sysplex is made up of a number of central processor complexes (CPCs) that collaborate, through specialized hardware and software, to process a work load. A single CPC comprises a single central processor (CP) and all associated system hardware and software, controlled by a single copy of the operating system (e.g., z/OS). One typical operating scenario for a sysplex is where applications running simultaneously on separate systems must be able to access the same data, or update a single database, etc., without compromising data integrity.

In this implementation, which is merely representative, a first-tier load balancer 402 determines which site 400 to route a new workload request to, and forwards the request to a second-tier load balancer 404 within that site 400. The second-tier load balancer 404 within the site determines which server application 406 within the site to route the workload request to, and forwards it to the z/OS system 408 where the server application is running. IBM Multi-site Workload Lifeline includes functionality to provide the different tiers with routing recommendations based on the availability and health of the server applications and the z/OS systems within the site.

In this particular implementation environment, Workload Lifeline includes agents 410 and advisors 412*a* and 412*b*. The advisors are implemented by z/OS WorkLoad Manager (WLM)). As illustrated, typically agents 410 execute on each z/OS system 408 in the two sites, and operate to monitor the health of the server applications 406 and the system where the agent is active. The agents 410 periodically send this information to the primary advisor 412*a*, as indicated by the network flows labeled 2. The primary advisor 412a uses this information to calculate routing recommendations for the workloads that use these server applications. The advisor 412a periodically sends recommendations to first-tier load balancers 402 about which site to route workload requests to, and recommendations to second-tier load balancers 404 about which server applications within a site 400 to route the workload requests to, as indicated by the network flows labeled 1. The primary advisor 412a also periodically notifies the secondary advisor 412b about any changes in the workload states, indicated by the network flows labeled 3, so that the secondary advisor 412b can take over primary advisor responsibilities if the current primary advisor 412a becomes non-operational.

Thus, when workload requests are handled by the first-tier load balancers 402, based on routing recommendations from the advisor 412a, the load balancer 402 selects a site 400 and forwards the request to the second-tier load balancer 404 in that site, indicated by the network flow labeled 4. When workload requests are handled by the second-tier load balancers 404, based on routing recommendations from the advisor 412a, the load balancer 404 selects a server application 406 in the site and forwards it to the TCP/IP stack 414 running on the z/OS system 408, indicated by the network flow labeled 5. When these second-tier load balancers 404 are external, they receive routing recommendations directly from the advisor 412a. When these second-tier load balancers 404 are internal, also known as z/OS sysplex distributors, they reside on a z/OS system 408 in the site, and receive routing recommendations directly by using z/OS Communications Server functions.

In another configuration (not shown), a second-tier load balancer is not responsible for routing workload requests to a server application within a site. In this case, load balancing within a site is performed by some other node, which is called an intermediary node. Typically, an intermediary node does not communicate directly with the advisor. It is used in cases where customized load balancing has been built into a workload. In this type of configuration, the z/OS sysplex distributor is still defined, but it is used only for obtaining recommendations and topology information that the first-tier load balancer uses to select the site for a workload connection request. The intermediary node makes the load balancing decision to select a server application instance within the site.

As explained above, typically a workload comprises one or more groups of applications that access the same data sources to provide related services for a client. In this example, preferably all server applications in a load balancer application group provide the same service for that client, and preferably each server application within an application group can provide the same services as the other applications in the group. The system provides the ability to group server applications that access different data sources into their own workload to provide more granular control of each group of applications.

In this example embodiment, a site is synonymous with a sysplex. Preferably, all z/OS target systems in a particular site belong to the same sysplex. In a typical configuration, and as described, the first-tier load balancer determines which site to route a new workload request to and forwards the request to a second-tier load balancer. The second-tier load balancer determines which server application within the site to route the workload request to and forwards it to the z/OS system where the server application is running. Multi-site Workload Lifeline provides the different tiers with routing recommendations based on the availability and health of the server applications and the z/OS systems within the site.

While the arrangement and techniques in FIG. 4 provide significant advantages, they are limited to TCP/IP-based connection monitoring and workload switching of TCP/IP server applications only.

Combining Disparate Applications into a Single Workload Group

With the above as background, the technique of this disclosure is now described.

According to this disclosure, different protocol applications are monitored and combined into a same workload, and load balancing decisions are made that affect both types of applications. In this approach, a load balancer is controlled to route workload connections that are destined to the different protocol applications the same way because these applications are grouped into the same workload.

In particular, and according to an embodiment of this disclosure, when both TCP/IP server applications and SNA applications access the same data sources (that are mirrored across sites), they are associated together within a same workload group so that these different types of applications can be monitored to determine an overall availability for the workload. Monitoring agents verify the health and availability of both the TCP/IP server applications and SNA applications, and such information is then used by a workload manager to create a distribution policy for the workload. The workload manager provides the distribution policy to a load balancing mechanism (e.g., a load balancer appliance) that is capable of distributing workload connections to any of these applications. The TCP/IP connections and SNA sessions for a workload group are then routed to one site, or the alternate site.

Thus, in contrast to the prior art techniques wherein the workload is limited to a single (e.g., TCP/IP) protocol application, the workload herein is based on combining different protocol applications in the same workload and then enabling load balancing decisions to be made that affect both types of applications. In the preferred embodiment, the different protocol applications are TCP/IP, and SNA. This is not a limitation, as the notion of combining different protocol applications into a same workload can be practiced with other protocols besides IP and SNA. Such other protocols include, without limitation, Bluetooth, IPX, AppleTalk, and others. Moreover, the approach of combining different protocol applications may incorporate two or more different protocols into a workload.

Figure 5:
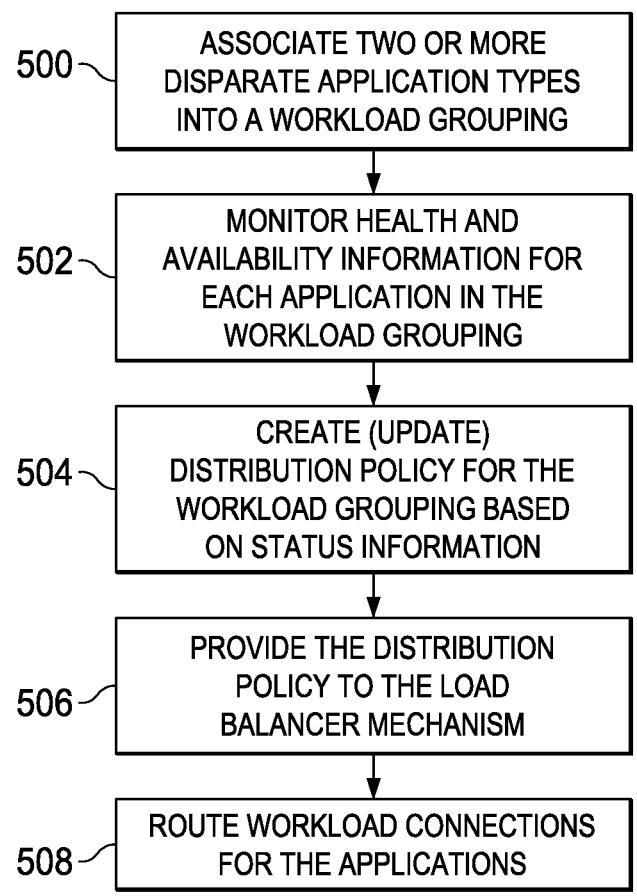
FIG. 5 illustrates the basic method of this disclosure wherein disparate applications are grouped and monitored as a single workload.

FIG. 5 illustrates the basic process at a high level. In step 500, the two or more different protocol applications are associated into a workload (sometimes referred to herein as a workload "group" or "grouping"). This association may be created manually (through an administrative interface, by an authorized user), automatically, programmatically, or by some combination of such activities. The applications share common data sources that are mirrored across at least two sites that are distinct from one another and typically remote from one another. At step 502, monitoring agents determine the availability and health of the applications. This information is then provided to a workload manager, which uses it to create a distribution policy for the workload. This is step 504. At step 506, the workload manager provides the distribution policy to a load balancer. The load balancer then routes workload connections that are destined from the different protocol applications. This is step 508. Thus, in the described approach, different protocol applications that comprise a same workload are monitored, and the collected information is used by a workload manager to create a distribution policy that then controls the routing of workload connections to the different protocol applications. The approach preferably is independent of the common data sources being used by the applications.

Thus, in the context of this disclosure, there are disparate or different server applications (including those in different workgroups) that may access the same (common) data source (or resource). Each site has its own copy of the data source, but these copies of the data source should not be accessed at the same time. For example, different server applications (such as one that uses TCP/IP network transport, and another that is SNA-based) may use the same table in a database, the same rows in a table in a database, the same file, the same memory location, or any other suitable types of resources. Generalizing, a data source or resource is any accessible system, device, application, program, process, thread, data store, storage or memory location, file, object, database, database component, or the like.

Figure 6:
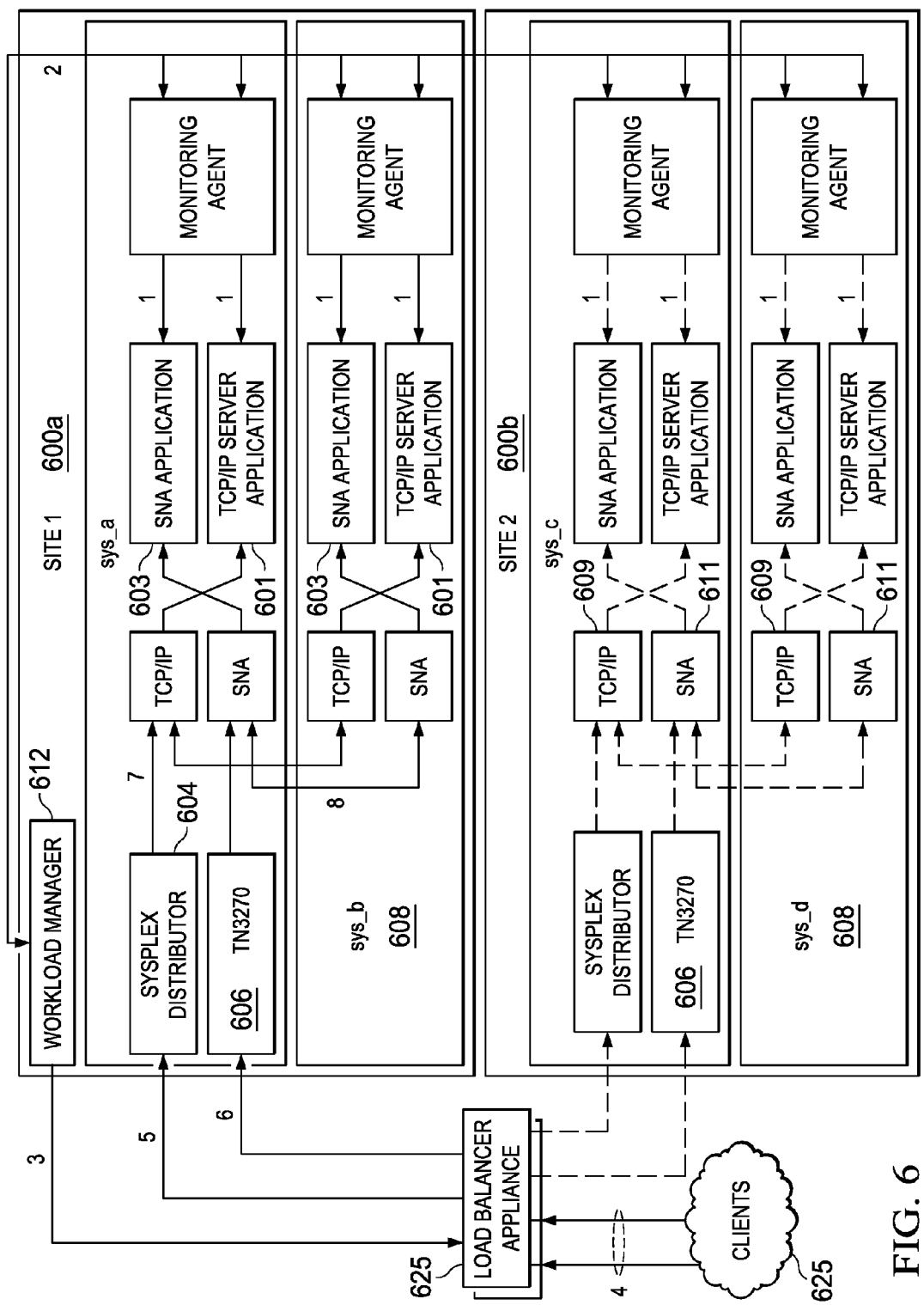
FIG. 6 illustrates the subject matter of this disclosure, wherein different protocol applications (e.g., TCP/IP server applications and SNA applications) are monitored and combined into a same workload, and load balancing decisions are made that affect both types of applications.

FIG. 6 illustrates a representative workload management environment in which the technique of this disclosure may be practiced. As noted above, this environment, in which a workload comprises TCP/IP server applications, together with SNA applications, is not intended to be limiting. As can be seen, and as was illustrated in FIG. 4, it is assumed that there are two or more sites, a pair of which is shown. Typically, and as noted above, the sites are located remote from one another. In this example, each site 600 operates as a sysplex, although this is not a limitation. The first (or primary) site 600a includes two computing systems 608, namely, sys_a and sys_b, whereas the secondary site 600b includes two computing systems 608, namely, sys_c and sys_d. Each computing system 608 may be a IBM z Series mainframe or other multi-component system (e.g., running z/OS, Linux on System z, or the like) that can support both TCP/IP and SNA protocol stacks, as well as both TCP/IP server and SNA applications. Thus, for example, computing system 608 supports a TCP/IP protocol stack 609 and an SNA protocol stack 611, and two types of applications, namely, a TCP/IP server application 601, and an SNA application 603. While the figure shows just a single TCP/IP server application and a single SNA application, this is not a limitation, as a particular computing system typically supports multiple such applications, or multiple instances of a same application. As also shown, each computing system 608 also supports a monitoring agent 605. As will be described, the monitoring agent 605 monitors the health and availability of both the TCP/IP server application 601, and that of the SNA application 603, that reside on the same computing system. Although not shown, there may be additional instances of the monitoring agent (e.g., a backup) executing on a particular computing system. Moreover, there may be a different monitoring agent for each type of application.

Thus, according to this disclosure, when a workload grouping comprises disparate applications (e.g. both TCP/IP server applications and SNA applications) such as shown in FIG. 6, the monitoring agent 605 is able to uniquely identify these different types of applications. Preferably, TCP/IP server applications 601 are identified by using an IP address and port number that the server application is using to accept incoming TCP/IP connection requests. Preferably, the SNA applications 603 are identified using an SNA network identifier, and an SNA resource name configured to the SNA stack 611. Thus, for example, the monitoring agent 605 determines the health and availability of the TCP/IP server application 601 by using existing APIs, e.g., SNMP or other types of queries. To monitor the availability of SNA applications, the monitoring agent 605 uses existing SNA commands to determine whether the SNA resource name is defined and active, and whether any SNA applications associated with that SNA resource are available. In a preferred approach, the monitoring agent evaluates SNA command responses for the SNA resource name defined for that application.

As also seen in FIG. 6, preferably the computing system 608 also includes a pair of mechanisms that are operative to distribute (direct) a received workload connection request (or, more generally, a "workload connection") to particular application instances executing in the computing system. Thus, in the TCP/IP-SNA embodiment, these mechanisms includes a distributor 604, which distributes workload connections to the one or more TCP/IP application instances, and a gateway 606, which distributes the workload connections to the one or more SNA application instances. As a skilled person will appreciate, when there are multiple instances of the TCP/IP applications or the SNA applications, these mechanisms provide an in-computing system (or "second-tier") load balancing function. Without intending to be limiting, the distributor 604 is a sysplex distributor (or its equivalent), and the gateway 606 is a proxy server, such as TN3270E, which converts a request using an IP protocol to an SNA protocol request.

As also seen in FIG. 6, the system includes a workload manager 612. The workload manager typically is implemented in software as a set of computer program instructions executed in one or more hardware processors. As mentioned above, and as depicted, the workload manager 612 receives the health and availability information from the various monitoring agents 605 within the computing systems in both sites, and it uses this information to identify a then-current network configuration (what applications are running where, their health and availability, etc.), and then to determine one or more distribution policies for the sites. Generally, a distribution policy is a set of instructions (or, more generally, a data set, or a mapping) by which the workload manager directs one or more load balancer appliances 600 how to distribute workload connection requests. Preferably, a distribution policy is updated periodically (e.g., every few seconds) based on information gathered by the monitoring agents. In one embodiment, the information from the monitoring agents is received by the workload manager 612 on a defined polling interval (e.g., every 10 seconds), as well as immediately when an unexpected event (e.g., an application is suddenly determined by the monitoring agent to be unavailable) occurs. As the workload manager receives this updated information, it creates a new distribution policy (or an update to an existing distribution policy), and then outputs the policy.

As seen in FIG. 6, the workload manager 612 outputs the distribution policy (or the update) to the load balancer appliance 600. This output may be provided over a secure channel, and using any request-response protocol. In this embodiment, the load balancer appliance is TCP/IP-based, and it operates to distribute both TCP/IP workload connection requests, as well as SNA workload connection requests. Stated another way, the load balancer 600 is capable of distributing workload connections to any of the applications that have been associated into the workgroup, even though these applications operate over different protocols. It is then the job of the workload manager 612 (based on input from the monitoring agents and other sources) to provide the distribution policy that, in turn, directs the load balancer appliance as to which subset of the applications should receive which workload connections. As depicted, the TCP/IP workload connections and the SNA workload connections are received from client machines (or "client") 625.

In operation, the one or more TCP/IP-based load balancer appliances 600 typically route the workload connection requests to the mechanisms 604 or 606, in either case to allow the respective TCP/IP requests or SNA sessions (within the shared workgroup) to be distributed to one of a set of appropriate application instances within one of the sites. Typically, and because it is desirable to ensure that the common data sources (that are mirrored across the sites) are not accessed at the same time, the load balancer routes any particular connection request to one and only one of the sites.

While FIG. 6 illustrates a pair of sites, there may be additional sites, in which case the load balancer is operative according to the distribution policy to route a connection request to one of the multiple sites.

The following provides a more detailed description of the processing flow.

As noted, both TCP/IP server applications 601 and SNA applications 603 executing in the computing system 608 across both sites comprise a workload group. Monitoring agents 605 are configured to monitor the health and availability of these applications. This is depicted by flow "1." The monitoring agents report the availability and health of the TCP/IP server applications and SNA applications that are on the same system as the monitoring agent and return this information to the workload manager 612. This is depicted by flow "2." The workload manager 612 uses this information to signal load balancer appliances 600 about the site to which particular workload connections should be distributed. This signaling is in the form of the distribution policy, as it may be updated periodically or on-demand, and is depicted by flow "3." As noted, clients 625 desiring access to this workload either access the data sources via the TCP/IP server application instances 601 or the SNA application instances 603. In particular, this is done by selecting a specific destination IP address and/or port that is defined on the load balancer appliance 600, that either maps to the TCP/IP workload access or the SNA workload access. This is depicted by flow "4." For client requests for TCP/IP server application access to the workload's data sources, the load balancer appliance 600 distributes connections to the second tier routing infrastructure in the active site. This is depicted by flow "5." In this example, the second tier routing infrastructure is a sysplex distributor node 604, which then forwards the connection request to one of the TCP/IP server application instances within the site. This is depicted by flow "7." For client requests for SNA application access to the workload's data sources, the load balancer appliance 600 distributes connections to the gateway in the active site. The gateway is required because the network load balancers typically speak IP; thus, for SNA, an IP connection from a client typically is processed through the gateway. This is depicted by flow "6." In this example, the gateway is a TN3270 server 606, which then operates to forward the connection request to one of the SNA application instances within the site. This is depicted by flow "8." This completes the process.

The particular manner in which SNA-based workload support is provided within a site will depend on the type of IP/SNA environment that is implemented. FIG. 6 described above illustrates one approach, namely, the use of TN3270 access to the SNA applications. Other approaches may include, without limitation, remote API access (via an RAPI server), message broker-based access, custom-written gateway access, and the like.

The technique of this disclosure provides significant advantages. Foremost, workload groups are defined and enforced with respect to disparate applications that access the same data sources. The approach enables the workload manager to monitor and switch workload connections for the disparate application types. The approach as described provides the particular advantage of enabling SNA-based workload support, especially for SNA applications that use IP connectivity from the requesting clients.

As noted above, the approach herein may be implemented with more than two disparate application types, and across two or more mirrored (with respect to the common data sources) sites. Thus, the workload group may comprise any number of disparate application types, and load balancing may be enforced across any number of such sites. In operation, the information that influences how workload connections get routed is provided by monitoring all of the disparate application types.

As has been described, the functionality described above may be implemented as a standalone approach, e.g., a software-based function executed by a processor, or it may be available as a service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The techniques described herein may be implemented in or in conjunction with various server-side architectures including simple n-tier architectures, web portals, federated systems, and the like. The techniques herein may be practiced in a loosely-coupled server (including a "cloud"-based) environment. An example of the latter environment is an Information Technology (IT) infrastructure that supports virtualization of resources. An environment of this type typically comprises host machines (HVs) (e.g., servers or like physical machine computing devices) connected to a physical datacenter network, typically via a hypervisor management VLAN. The environment typically also includes load balancers, network data switches (e.g., top-of-rack switches), firewalls, and the like. Physical servers in the environment are each adapted to dynamically provide one or more virtual machines (VMs) using virtualization technology. Multiple VMs can be placed into a single host machine and share the host machine's CPU, memory and other resources, thereby increasing the utilization of an organization's data center. Disparate applications executing within the context of such a cloud or virtualized infrastructure may take advantage of the workgroup management technique of this disclosure.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a non-transitory computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the interfaces and utility are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein generally provide for the above-described improvements to a technology or technical field, as well as the specific technological improvements to workload management schemes, such as described above.

Having described our invention, what we now claim is as follows:

1. A method for managing requests to access a data source, wherein the requests are directed to instances of first or second applications that are each supported in first and second sites, and wherein each of the first and second sites has its own copy of the data source, comprising:
   associating into a workload group instances of the first and second applications;
   receiving status information associated with a status of each of the first and second applications that comprise the workload group;
   using the received status information to generate a distribution policy for workload connection requests to access the data source, the distribution policy derived from the received status information about both the first and second applications; and
   providing the distribution policy to a load balancer that has responsibility to select which of the first and second sites receives a particular workload connection request;
   wherein the receiving, using and providing operations are carried out by software executing in at least one hardware processor.

2. The method as described in claim 1 further including:
   receiving, at a given one or more first and second sites, a new workload connection request to access the data source issued from the load balancing appliance and based on the provided distribution policy; and
   directing the received new workload connection request to one of: an instance of a first application, and an instance of a second application.

3. The method as described in claim 2 wherein the first application is a TCP/IP server application, and the second application is an SNA application.

4. The method as described in claim 3 wherein the status information is health and availability information associated with each of the TCP/IP server and SNA applications.

5. The method as described in claim 4 wherein the health and availability information associated with the TCP/IP server application is obtained over an application programming interface (API) query.

6. The method as described in claim 4 wherein the health and availability information associated with the SNA application is obtained by evaluating an SNA command response for an SNA resource name defined for the SNA application.

7. The method as described in claim 1 further including updating the distribution policy periodically, or on-demand as a status of one of the first and second applications changes.

* * * * *